(No Model.)  2 Sheets—Sheet 1.
H. W. WEISS.
Milk Cooler and Heater.
No. 230,976. Patented Aug. 10, 1880.
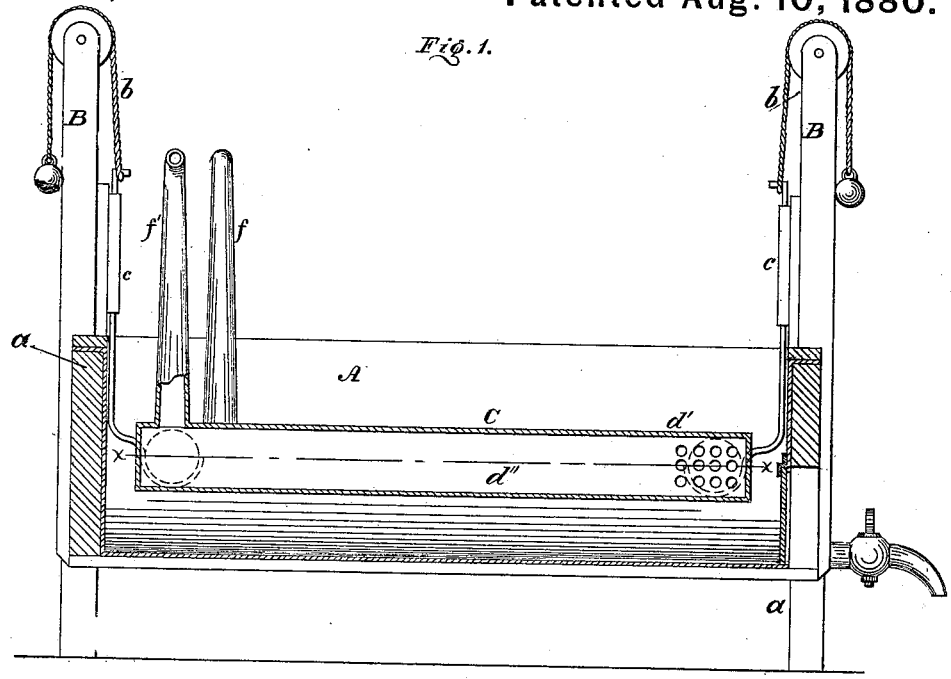
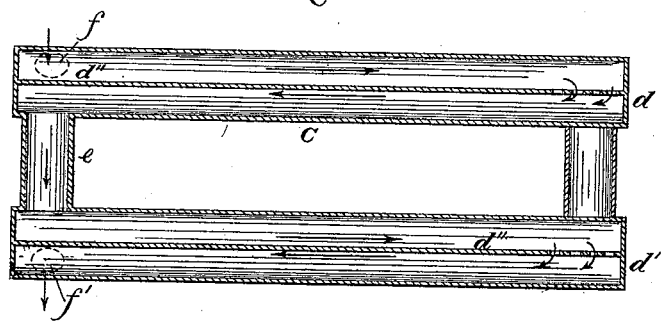
Witnesses:
A. P. Grant,
H. F. Kircher
Inventor:
Henry W. Weiss,
by Jean A. Dudersheim
ATTORNEY.
N. PETERS, PHOTO-LITHOGRAPHER, WASHINGTON, D. C.

(No Model.)  2 Sheets—Sheet 2.
H. W. WEISS.
Milk Cooler and Heater.
No. 230,976.  Patented Aug. 10, 1880.
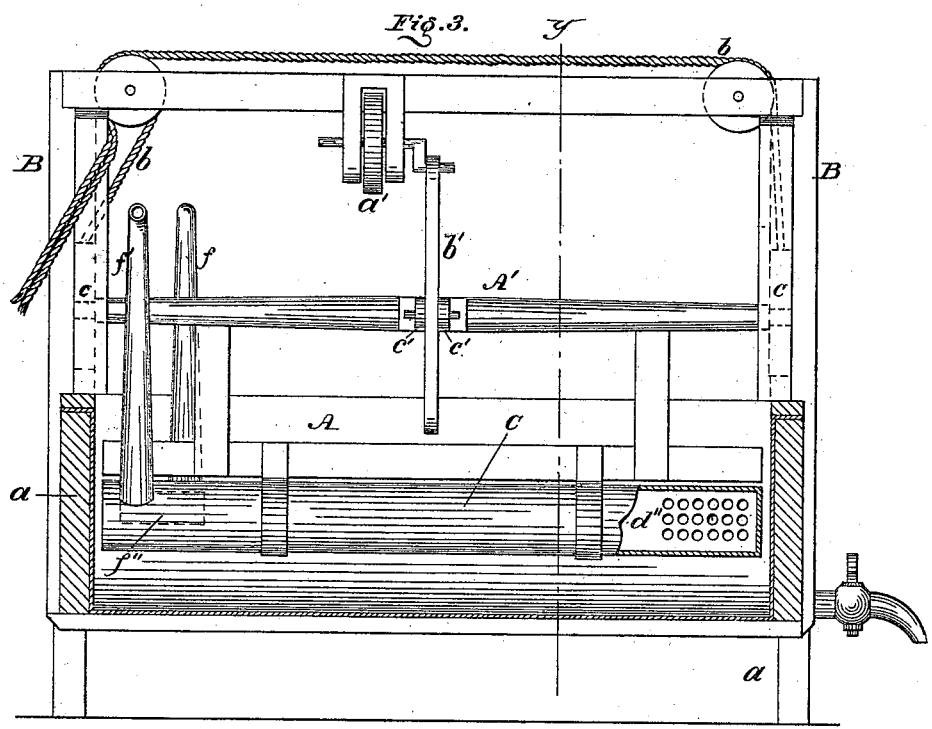
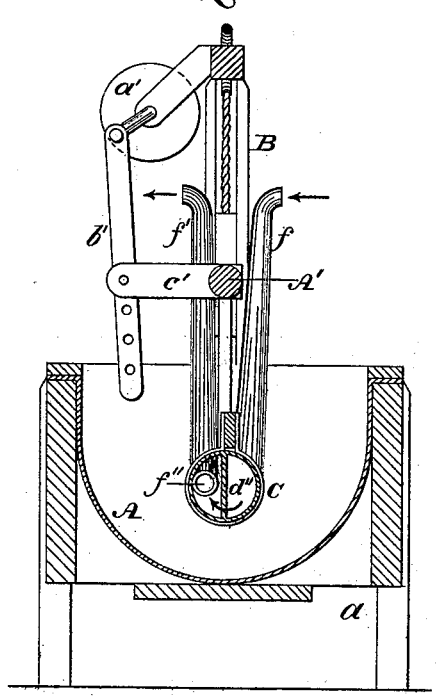
Witnesses:
A. P. Grant,
W. F. Kircher
Inventor:
Henry W. Weiss,
by John A. Wiedersheim
ATTORNEY.

UNITED STATES PATENT OFFICE.

HENRY W. WEISS, OF QUAKERTOWN, PENNSYLVANIA.

MILK COOLER AND HEATER.

SPECIFICATION forming part of Letters Patent No. 230,976, dated August 10, 1880.

Application filed March 27, 1880. (No model.)

*To all whom it may concern:*

Be it known that I, HENRY W. WEISS, a citizen of the United States, residing at Quakertown, in the county of Bucks and State of Pennsylvania, have invented a new and useful Improvement in Milk Coolers or Heaters, which improvement is fully set forth in the following specification and accompanying drawings, in which—

Figure 1 is a view of the interior of the device embodying my invention. Fig. 2 is a horizontal section in line $x\ x$, Fig. 1. Fig. 3 is a view of the interior of a modification. Fig. 4 is a transverse section thereof in line $y\ y$.

Similar letters of reference indicate corresponding parts in the several figures.

This invention relates to devices for cooling and heating; and it consists in certain improvements in the tubes used for conducting the refrigerating or warming fluid, substantially as set forth.

The conveyers may be raised or lowered relatively to the depth of milk.

Referring to the drawings, A represents a vat or pan supported on a suitable frame, $a$, and having uprights B, from which is suspended within the vat, by means of cords $b$ and vertical slides $c$, the conveyer C, for cold water, the same consisting of two longitudinal tubes, $d\ d'$, connected by a transverse tube, $e$, each tube having a longitudinal partition, $d''$, which extends from one end to nearly the other end, thus forming in each tube two communicating passages. An inlet-pipe, $f$, communicates with one of the passages at the commencement of the tube $d$, and an outlet-pipe, $f'$, communicates with one of the passages at the termination of the tube $d'$.

The operation is as follows: Milk is placed in the vat A, and cold water directed into the pipe $f$. The water enters one passage of the tube $d$ and flows therethrough to its end, and returns through the other passage of said tube $d$ to the transverse tube $e$, by which it is directed into one of the passages of the tube $d'$, and flowing therethrough enters the other passage of said tube $d'$, and flowing the length thereof escapes through the outlet-pipe $f'$.

It will be seen that the conveyer has a large cooling-surface, and the milk will be cooled in a quick and expeditious manner.

The cords $b$ pass over pulleys on the uprights B, and are provided with the counterbalance weights, whereby the conveyer may be raised or lowered relatively to the depth of milk in the vat and retain its adjusted position.

In Fig. 3 I show the conveyer C, formed of a single tube longitudinally partitioned and connect it to a frame, A', hinged to the slides $c$, so that rocking motions may be imparted to the tube, which is essential when hot water or steam is introduced into the tube for warming the milk, although this feature is serviceable when it is desired to cool the milk, and cold water is directed into the tube.

Rocking motions are imparted to the tube by means of a pulley, $a'$, mounted on the top connecting-piece of the uprights B, having a crank-shaft or wrist-pin, to which is attached an adjustable connecting rod or bar, $b'$, whose lower end is pivoted to projecting-pieces $c'$ on the frame A' of the conveyer-tube C, whereby, by the rotation of the pulley $a'$ and consequent operation of the connected parts, the tube is caused to rock and moves through the milk in a hot or cold state.

The bend $f'''$ of the pipe $f'$ prevents water of condensation in the tube C being blown out with the steam.

Having thus described my invention, what I claim as new, and desire to secure by Letters Patent, is—

1. The horizontal partitioned conveyer C, in combination with inlet-pipe $f$ and outlet-pipe $f'$, having bend $f'''$, substantially as and for the purpose set forth.

2. The conveyer C, in combination with outlet-pipe $f'$, having bend $f'''$, substantially as and for the purpose set forth.

3. Conveyer C, in combination with rockshaft A', crank-wheel $a'$, and arms $b'\ c'$, having an adjustable connection to regulate the vibration of the conveyer, substantially as set forth.

HENRY W. WEISS.

Witnesses:
JOHN A. WIEDERSHEIM,
A. P. GRANT.